(12) United States Patent
Velisetti et al.

(10) Patent No.: US 11,809,409 B2
(45) Date of Patent: Nov. 7, 2023

(54) MULTI-TENANT DISTRIBUTED LEDGER INTERFACES

(71) Applicant: Salesforce, Inc., San Francisco, CA (US)

(72) Inventors: Sri Naga Deepthi Velisetti, Dublin, CA (US); Prithvi Krishnan Padmanabhan, Dublin, CA (US)

(73) Assignee: Salesforce, Inc., San Francisco, CA (US)

(*) Notice: Subject to any disclaimer, the term of this patent is extended or adjusted under 35 U.S.C. 154(b) by 447 days.

(21) Appl. No.: 16/228,569

(22) Filed: Dec. 20, 2018

(65) Prior Publication Data
US 2020/0089672 A1 Mar. 19, 2020

Related U.S. Application Data

(60) Provisional application No. 62/733,538, filed on Sep. 19, 2018.

(51) Int. Cl.
*G06F 16/00* (2019.01)
*G06F 16/23* (2019.01)
(Continued)

(52) U.S. Cl.
CPC .......... *G06F 16/2379* (2019.01); *G06F 16/27* (2019.01); *H04L 9/0637* (2013.01);
(Continued)

(58) Field of Classification Search
None
See application file for complete search history.

(56) References Cited

U.S. PATENT DOCUMENTS

| 6,356,897 B1 | 3/2002 | Gusack |
| 7,730,478 B2 | 6/2010 | Weissman |

(Continued)

FOREIGN PATENT DOCUMENTS

| CN | 103329129 A | 9/2013 |
| CN | 106537346 A | 3/2017 |

(Continued)

OTHER PUBLICATIONS

International Search Report and Written Opinion for Application No. PCT/US2019/036103, dated Aug. 1, 2019, 12 pages.

(Continued)

*Primary Examiner* — Thu Nguyet T Le
(74) *Attorney, Agent, or Firm* — Nicholson, De Vos, Webster & Elliott, LLP

(57) ABSTRACT

A set of interfaces is described for implementing a blockchain network by a multi-tenant server, wherein the set of interfaces comprise an object mapping interface. The object mapping interface includes a set object function to designate a tenant object for use in the blockchain network based on an input object; a map function to map fields of the tenant object in a multi-tenant system managed by the multi-tenant server and fields of an exchange object used by the blockchain network based on an input set of field mappings; and a set owner function to set a tenant in the multi-tenant system as an owner of the mappings based on an input identifier.

13 Claims, 15 Drawing Sheets

(51) Int. Cl.
  *H04L 9/06* (2006.01)
  *H04L 67/1097* (2022.01)
  *H04L 67/1087* (2022.01)
  *G06F 16/27* (2019.01)
  *H04L 9/00* (2022.01)

(52) U.S. Cl.
  CPC ...... *H04L 67/1091* (2013.01); *H04L 67/1097* (2013.01); *H04L 9/50* (2022.05)

(56) References Cited

U.S. PATENT DOCUMENTS

| | | | |
|---|---|---|---|
| 8,271,641 B2 | 9/2012 | Fry et al. | |
| 8,326,876 B1 | 12/2012 | Venkataraman et al. | |
| 8,886,671 B1 | 11/2014 | Ro et al. | |
| 9,075,889 B2 | 7/2015 | Calvin et al. | |
| 9,276,995 B2 | 3/2016 | Calvin et al. | |
| 9,317,843 B2 | 4/2016 | Bradley et al. | |
| 9,448,773 B2 | 9/2016 | Calvin et al. | |
| D768,690 S | 10/2016 | Conn | |
| 9,525,720 B2 | 12/2016 | Calvin et al. | |
| 9,572,614 B2 | 2/2017 | Calvin et al. | |
| 9,635,090 B2 | 4/2017 | Calvin et al. | |
| D800,148 S | 10/2017 | Conn | |
| 9,811,506 B2 | 11/2017 | Calvin | |
| 9,992,022 B1 | 6/2018 | Chapman et al. | |
| 10,027,735 B2 | 7/2018 | Calvin et al. | |
| 10,117,697 B2 | 11/2018 | Calvin et al. | |
| 10,212,209 B2 | 2/2019 | Calvin et al. | |
| 10,305,833 B1 | 5/2019 | MacGregor | |
| 10,445,643 B2 | 10/2019 | Katz et al. | |
| 10,489,786 B2 | 11/2019 | Yu et al. | |
| 10,693,954 B2 | 6/2020 | Kozloski et al. | |
| 11,100,091 B2 | 8/2021 | Padmanabhan et al. | |
| 11,709,823 B2 | 7/2023 | Bates et al. | |
| 11,720,546 B2 | 8/2023 | Rogynskyy et al. | |
| 2002/0194501 A1 | 12/2002 | Wenocur et al. | |
| 2003/0149934 A1* | 8/2003 | Worden ................. G06F 16/84 715/239 |
| 2008/0034228 A1 | 2/2008 | Shear et al. | |
| 2010/0005443 A1 | 1/2010 | Kwok et al. | |
| 2011/0276490 A1 | 11/2011 | Wang et al. | |
| 2013/0238557 A1 | 9/2013 | Mandelstein et al. | |
| 2013/0290406 A1 | 10/2013 | Calvin et al. | |
| 2014/0122649 A1 | 5/2014 | Calvin et al. | |
| 2014/0122993 A1 | 5/2014 | Calvin et al. | |
| 2014/0304692 A1 | 10/2014 | Calvin et al. | |
| 2015/0127781 A1 | 5/2015 | Calvin et al. | |
| 2015/0235014 A1 | 8/2015 | Evans et al. | |
| 2015/0348017 A1 | 12/2015 | Allmen | |
| 2015/0379510 A1 | 12/2015 | Smith | |
| 2016/0012465 A1 | 1/2016 | Sharp | |
| 2016/0021166 A1 | 1/2016 | Calvin et al. | |
| 2016/0048481 A1 | 2/2016 | Calvin | |
| 2016/0088058 A1 | 3/2016 | Calvin et al. | |
| 2016/0098723 A1 | 4/2016 | Feeney | |
| 2016/0104005 A1 | 4/2016 | Toussaint et al. | |
| 2016/0162873 A1 | 6/2016 | Zhou et al. | |
| 2016/0164947 A1 | 6/2016 | Calvin et al. | |
| 2016/0292672 A1 | 10/2016 | Fay et al. | |
| 2017/0039330 A1 | 2/2017 | Tanner et al. | |
| 2017/0048301 A1 | 2/2017 | Calvin et al. | |
| 2017/0140408 A1 | 5/2017 | Wuehler | |
| 2017/0147808 A1 | 5/2017 | Kravitz | |
| 2017/0178127 A1 | 6/2017 | Kravitz | |
| 2017/0213210 A1 | 7/2017 | Kravitz | |
| 2017/0252085 A1 | 9/2017 | Calvin et al. | |
| 2017/0287090 A1 | 10/2017 | Hunn et al. | |
| 2017/0337534 A1 | 11/2017 | Goeringer et al. | |
| 2017/0344618 A1 | 11/2017 | Horowitz et al. | |
| 2017/0352012 A1 | 12/2017 | Hearn et al. | |
| 2018/0005186 A1 | 1/2018 | Hunn | |
| 2018/0006831 A1 | 1/2018 | Toll et al. | |
| 2018/0018723 A1 | 1/2018 | Nagla et al. | |
| 2018/0082296 A1 | 3/2018 | Brashers | |
| 2018/0173719 A1 | 6/2018 | Bastide et al. | |
| 2018/0176371 A1 | 6/2018 | Kapur et al. | |
| 2018/0219676 A1 | 8/2018 | Mattingly et al. | |
| 2018/0248880 A1 | 8/2018 | Sardesai et al. | |
| 2018/0285322 A1 | 10/2018 | Calvin | |
| 2018/0309567 A1 | 10/2018 | Wooden | |
| 2018/0315141 A1 | 11/2018 | Hunn et al. | |
| 2018/0343111 A1 | 11/2018 | Chen et al. | |
| 2019/0005268 A1 | 1/2019 | Gupta | |
| 2019/0034716 A1 | 1/2019 | Kamarol et al. | |
| 2019/0043201 A1 | 2/2019 | Strong et al. | |
| 2019/0045207 A1 | 2/2019 | Chen et al. | |
| 2019/0058709 A1 | 2/2019 | Kempf et al. | |
| 2019/0087446 A1 | 3/2019 | Sharma et al. | |
| 2019/0087449 A1 | 3/2019 | Rybacki et al. | |
| 2019/0165943 A1 | 5/2019 | Chari et al. | |
| 2019/0179951 A1* | 6/2019 | Brunet .................. H04L 9/3239 |
| 2019/0229890 A1* | 7/2019 | Brehmer ............... G06F 40/174 |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1 | 8/2019 | Padmanabhan et al. | |
| 2019/0238316 A1 | 8/2019 | Padmanabhan | |
| 2019/0238525 A1 | 8/2019 | Padmanabhan et al. | |
| 2019/0268407 A1 | 8/2019 | Zeng et al. | |
| 2019/0303121 A1 | 10/2019 | Padmanabhan | |
| 2019/0303445 A1 | 10/2019 | Padmanabhan | |
| 2019/0377806 A1 | 12/2019 | Padmanabhan et al. | |
| 2019/0379721 A1 | 12/2019 | Calvin et al. | |
| 2020/0036515 A1 | 1/2020 | Chari et al. | |
| 2020/0042939 A1 | 2/2020 | Padmanabhan | |
| 2020/0051011 A1 | 2/2020 | Dasari et al. | |
| 2020/0051041 A1 | 2/2020 | Ko | |
| 2020/0074457 A1 | 3/2020 | Coleman et al. | |
| 2020/0084027 A1 | 3/2020 | Duchon et al. | |
| 2020/0099688 A1 | 3/2020 | Anders et al. | |
| 2020/0185070 A1 | 6/2020 | Dahmani | |
| 2020/0211305 A1 | 7/2020 | Bender et al. | |
| 2020/0250174 A1 | 8/2020 | Padmanabhan et al. | |
| 2020/0252406 A1 | 8/2020 | Padmanabhan et al. | |
| 2020/0374106 A1 | 11/2020 | Padmanabhan et al. | |
| 2021/0271649 A1 | 9/2021 | Narayanaswami et al. | |

FOREIGN PATENT DOCUMENTS

| | | |
|---|---|---|
| CN | 106663036 A | 5/2017 |
| CN | 107169371 A | 9/2017 |
| CN | 107615317 A | 1/2018 |
| CN | 107666388 A | 2/2018 |
| CN | 108139944 A | 6/2018 |
| CN | 108428168 A | 8/2018 |
| CN | 108537640 A | 9/2018 |
| JP | 2015-513153 A | 4/2015 |
| JP | 2017-195627 A | 10/2017 |
| JP | 2018-055203 A | 4/2018 |
| JP | 2018-533103 A | 11/2018 |
| WO | 2016161073 A1 | 10/2016 |
| WO | 2017/003974 A1 | 1/2017 |
| WO | 2017/024071 A1 | 2/2017 |
| WO | 2018007828 A2 | 1/2018 |
| WO | 2018/056445 A1 | 3/2018 |
| WO | 2020/061226 A1 | 3/2020 |

OTHER PUBLICATIONS

Non-Final Office Action, U.S. Appl. No. 16/228,555, dated Jan. 13, 2021, 13 pages.
Non Final Office Action, U.S. Appl. No. 16/228,501, dated Oct. 28, 2020, 10 pages.
Non-Final Office Action, U.S. Appl. No. 16/228,528, dated Oct. 9, 2020, 11 pages.
International Search Report and Written Opinion, Intl. App. No. PCT/US2019/051781, dated Dec. 10, 2019, 13 pages.
International Search Report and Written Opinion, Intl. App. No. PCT/US2019/051782, dated Jan. 10, 2020, 12 pages.
International Search Report and Written Opinion, Intl. App. No. PCT/US2019/051783, dated Dec. 11, 2019, 11 pages.

(56) References Cited

OTHER PUBLICATIONS

Nakamoto, Satoshi, "Bitcoin: A Peer-to-Peer Electronic Cash System", Satoshi Nakamoto Institute, Oct. 31, 2008, 9 pages.
Xia et al., "MeDShare: Trust-Less Medical Data Sharing Among Cloud Service Providers via Blockchain" IEEE Access, vol. 5, 2017, pp. 14757-14767.
Yu et al., "Virtualization for Distributed Ledger Technology (vDLT)", IEEE Access, vol. 6, 2018, pp. 25019-25028.
Final Office Action, U.S. Appl. No. 16/228,528, dated Apr. 5, 2021, 13 pages.
Non-Final Rejection, U.S. Appl. No. 16/136,077, dated Jun. 9, 2021, 11 pages.
Notice of Allowance, U.S. Appl. No. 16/228,501, dated Apr. 13, 2021, 8 pages.
Notice of Allowance, U.S. Appl. No. 16/228,501, dated Jul. 8, 2021, 9 pages.
Notice of Allowance, U.S. Appl. No. 16/228,528, dated Jun. 25, 2021, 9 pages.
Notice of Allowance, U.S. Appl. No. 16/228,555, dated Apr. 30, 2021, 11 pages.
Notice of Allowance, U.S. Appl. No. 16/228,555, dated Jun. 29, 2021, 2 pages.
Advisory Action, U.S. Appl. No. 16/136,077, dated Mar. 3, 2022, 3 pages.
Final Office Action, U.S. Appl. No. 16/136,077, dated Dec. 16, 2021, 15 pages.
First Office Action, CN App. No. 201980073841.6, dated Nov. 30, 2021, 16 pages (6 pages of English Translation and 10 pages of Original Document).
International Preliminary Report on Patentability, PCT App. No. PCT/US2019/036103, dated Dec. 24, 2020, 8 pages.
International Preliminary Report on Patentability, PCT App. No. PCT/US2019/051781, dated Apr. 1, 2021, 8 pages.
International Preliminary Report on Patentability, PCT App. No. PCT/US2019/051782, dated Apr. 1, 2021, 9 pages.
International Preliminary Report on Patentability, PCT App. No. PCT/US2019/051783, dated Apr. 1, 2021, 8 pages.
Notification to Grant Patent Right for Invention and Search Report, CN App. No. 201980076057.0, dated Feb. 8, 2022, 7 pages (2 pages of English Translation and 5 pages of Original Document Only).
Notification to Grant Patent Right for Invention, CN App. No. 201980076006.8, dated Dec. 14, 2021, 6 pages (2 pages of English Translation and 4 pages of Original Document).
Non-Final Office Action, U.S. Appl. No. 17/496,675, dated Nov. 25, 2022, 20 pages.
Notice of Reasons for Rejection, JP App. No. 2021-515119, dated Oct. 28, 2022, 6 pages (3 pages of English Translation and 3 pages of Original Document).
Notice of Reasons for Rejection, JP App. No. 2021-515119, dated Oct. 18, 2022, 6 pages (3 pages of English Translation and 3 pages of Original Document).
Decision to Grant, JP App. No. 2021-515118, dated Aug. 23, 2022, 5 pages (2 pages of English Translation and 3 pages of Original Document).
Examination Report No. 1, AU App. No. 2019345039, dated Aug. 11, 2022, 3 pages.
Examination Report No. 1, AU App. No. 2019345041, dated Aug. 16, 2022, 4 pages.
Non-Final Office Action, U.S. Appl. No. 16/136,077, dated Jun. 24, 2022, 15 pages.
Notice of Allowance, CN App. No. 201980073841.6, dated May 10, 2022, 05 pages of Original Document Only.
Final Office Action, U.S. Appl. No. 16/136,077, dated Mar. 31, 2023, 21 pages.
Examination Report No. 2, AU App. No. 2019345041, dated Jan. 27, 2023, 4 pages.
Examination report, AU App. No. 2019345039, dated Jan. 30, 2023, 4 pages.
Decision to Grant a Patent, JP App. No. 2021-515119, dated Mar. 22, 2023, 5 pages (2 pages of English Translation and 3 pages of Original Document).
Examination report, AU App. No. 2019345039, dated May 16, 2023, 4 pages.
Examination report, AU App. No. 2019345041, dated May 16, 2023, 4 pages.
Notice of Allowance, U.S. Appl. No. 17/496,675, dated May 25, 2023, 10 pages.
Notice of Allowance, U.S. Appl. No. 16/136,077, dated Aug. 31, 2023, 2 pages.
Notice of Allowance, U.S. Appl. No. 16/136,077, dated Aug. 28, 2023, 10 pages.
Notice of Allowance, U.S. Appl. No. 17/496,675, dated Aug. 11, 2023, 2 pages.
Notice of Allowance, U.S. Appl. No. 17/496,675, dated Jun. 22, 2023, 2 pages.
Examination report 1, AU App. No. 2019345040, dated Jun. 14, 2023, 5 pages.
Examination report 4, AU App. No. 2019345039, dated Aug. 11, 2023, 5 pages.
Examination report 4, AU App. No. 2019345041, dated Aug. 14, 2023, 4 pages.
Notice of Allowance, JP App. No. 2021-515188, dated Aug. 8, 2023, 5 pages.

\* cited by examiner

```
global interface ObjectMapping {
    public void setObject(Object object);
    public Object getObject();

public void setFieldMapping(Id tenant, Map<String, String> fieldMapping);
    public Map<String, String> getFieldMapping(Id tenant);

public void setOwner(Id owner);
    public Id getOwner();
}
```

FIG. 2

```
400 global interface TransactionMessage {
    public void setId(String name);
    public String getId();

public void setFromAddress(DigitalAddress fromAddress);
    public DigitalAddress getFromAddress();

public void setToAddress(DigitalAddress toAddress);
    public DigitalAddress getToAddress();

public void setFromId(Id id, IMDLIdLevel idLevel);
    public Id getFromId();

public void setToId(Id id, IMDLIdLevel idLevel);
    public Id getToId();

public void setObjectMapping (ObjectMapping objectMapping);
    public ObjectMapping getObjectMapping();

```
global interface Transaction {
    public void setId(String name);
    public String getId();

public void setTransactionMessage(TransactionMessage transactionMessage)
    public TransactionMessage getTransactionMessage();

public void setTransactionType(TransactionType TransactionType)
    public TransactionType getTransactionType();
}
```

FIG. 6

```
global ENUM TransactionType {
TRANSFER, APPROVE, CONSENT, SHARE_OWNERSHIP, QUERY, BALANCE_OF, ALLOWANCE
}
```

FIG. 7

```
global interface Contract {
    public Boolean action(Transaction transaction);

public Boolean runRules(Set<rules>);
}
```

```
global interface TokenTransactionMessage extends TransactionMessage {
    public void setTokens(Double tokens);
    public Double getTokens();

public void setTokenPercent(Double percent);
    public Double getTokenPercent();
}
```

```
global interface TokenContract extends Contract {
    public Boolean action(TokenTransactionMessage transaction);
}
```

FIG. 11

```
1200 public class CompanyATokenCotract implements TokenContract {
    public Boolean action(TokenTransactionMessage transaction)
    {
        ...
    } public Boolean runRules(Set<rules>)
    {
        ...
    }
}
```

FIG. 12

```
global interface NetworkService {
    public Boolean initializeConsortium(List<DigitalAddress> memberAddresses);
    public Boolean initializeConsortium(List<Id> orgIds);

public Boolean addMemberToConsortium(DigitalAddress memberAddress);
    public Boolean addMemberToConsortium(Id orgId);

public List<DigitalAddress> getConsortiumMembersByAddress();
    public List<Id> getConsortiumMembersByOrgId();
}
```

MULTI-TENANT DISTRIBUTED LEDGER INTERFACES

CROSS-REFERENCE TO RELATED APPLICATIONS

This application claims the benefit of U.S. Provisional Application No. 62/733,538, filed Sep. 19, 2018, which is hereby incorporated by reference.

TECHNICAL FIELD

One or more implementations relate to the field of data management; and more specifically, to use of a set of interfaces in a centralized implementation of a peer-to-peer blockchain network.

BACKGROUND

A blockchain is a continuously expanding list of records/blocks that are linked and secured using cryptography. In particular, every block in a blockchain may include a cryptographic hash of the immediately preceding block, a timestamp for the current block, and transaction data (e.g., the addition/modification of information associated with a peer in a blockchain network). Further, the blockchain may be shared and managed through a peer-to-peer network via a system of verifying/validating new blocks to be added to the chain such that a block in a blockchain cannot be altered without alteration of all subsequent blocks, which requires network consensus. This architecture allows for security of information stored within blocks through the use of cryptography; sharing/distribution of information through the use of peer-to-peer networks; trust through the use of consensus of block addition; and immutability of information stored within blocks through the use of cryptography, chaining/linking of blocks, and peer distribution (e.g., each peer in the blockchain network may maintain a ledger of all verified/validated transactions in the network).

In contrast to a blockchain architecture, a multi-tenant cloud architecture relies on centralization of information in a common database or other data structure. Although cloud-based architectures provide many benefits in comparison to blockchain architectures, including the ability to remove many management functions from tenants and instead focus these functions on a centralized system, these architectures do not provide the same level of security, trust, and immutability of information during inter-tenant communications of data.

Conventional blockchain networks are configured for specific types of transactions. Most notably, some blockchain networks are configured for coin transactions (sometimes referred to as "currency" or "token" transactions). Accordingly, data structures and objects are specially configured for these types of transactions. Since all data structures and objects, including associated functions and variables, are configured for a specific type of transaction, these blockchain networks cannot be easily extended to other types of transactions. For example, blockchain networks involving coin transactions cannot be easily extended to data transactions (e.g., data transaction related to medical records) as all data structures and objects are configured for coin transactions.

Moreover, blockchain networks are not configured for multi-tenant systems and instead operate in a distributed infrastructure. Adapting these blockchain networks for multi-tenant systems is difficult as all data structures/objects are configured for distributed infrastructures.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 2 shows an object mapping interface, according to one example implementation.

FIG. 4 shows a transaction message interface, according to one example implementation.

FIG. 6 shows a transaction interface, according to one example implementation.

FIG. 7 shows an enumerated transaction type object, according to one example implementation.

FIG. 8 shows a contract interface, according to one example implementation.

FIG. 10 shows a token transaction message interface, according to one example implementation.

FIG. 11 shows a token contract interface, according to one example implementation.

FIG. 12 shows a token contract, according to one example implementation.

FIG. 13 shows a consortium interface, according to one example implementation.

DETAILED DESCRIPTION

Figure 1:
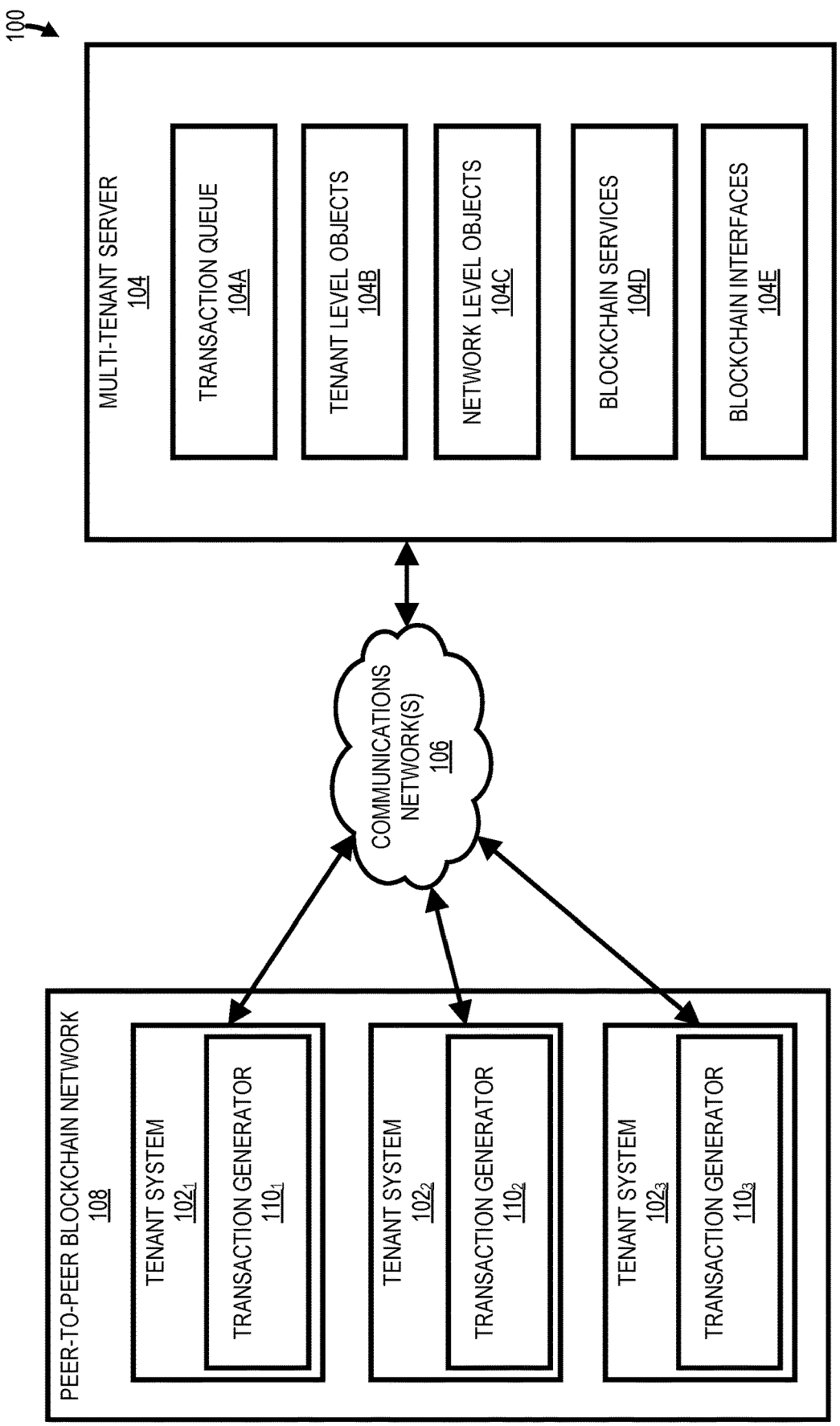
FIG. 1 shows a block diagram illustrating a computing environment, including a set of blockchain interfaces of a multi-tenant server, according to one example implementation.

FIG. 1 is a block diagram illustrating a computing environment 100, according to one example implementation. The computing environment 100 includes tenant systems $102_1$-$102_3$, a multi-tenant server 104, and a set of communications networks 106. In this example computing environment 100, the tenant systems $102_1$-$102_3$ may be part of a peer-to-peer blockchain network 108 and the multi-tenant server 104 provides a cloud environment to manage data and transactions of the tenant systems $102_1$-$102_3$ in the peer-to-peer blockchain network 108 via a transaction queue 104A, tenant level objects 104B, network level objects 104C, blockchain services 104D, and blockchain interfaces 104E. In particular, the multi-tenant server 104 provides blockchain interfaces 104E that may be used for configuring the peer-to-peer blockchain network 108 to operate using various types of data and/or transactions (e.g., transactions involving tokens (sometimes referred to as "coins" or "currency") or medical records).

As will be described herein, the tenant systems $102_1$-$102_3$ are part of a multi-tenant environment/system that is managed by the multi-tenant server 104. For example, the multi-tenant server 104 may manage a multi-tenant database management system (DBMS) in which the users/tenants associated with the tenant systems $102_1$-$102_3$ are able to store and/or retrieve data. A multi-tenant DBMS refers to those systems in which various elements of hardware and software of the DBMS may be shared by one or more tenants (e.g., the tenant systems $102_1$-$102_3$). For example, a given server (e.g., the multi-tenant server 104) may simultaneously process requests for a great number of tenants, and a given database table may store records for a potentially much greater number of tenants. In addition to managing a multi-tenant environment/system for the tenant systems $102_1$-$102_3$, as noted above, the multi-tenant server 104 may also manage the peer-to-peer blockchain network 108 on behalf of the tenant systems $102_1$-$102_3$. Although shown with three tenant systems 102 (e.g., the tenant systems $102_1$-$102_3$), the peer-to-peer blockchain network 108 may include any number of tenant systems 102. In some embodiments, the peer-to-peer blockchain network 108 may be viewed as a distributed network that is controlled by the multi-tenant server 104 with inputs/requests from the tenant systems 102.

In some implementations, a transaction generator 110 of a tenant system 102 may generate a request to (1) add a new record to a physical object associated with the tenant system 102 or (2) modify an existing record of the physical object associated with the tenant system 102. The physical object may include a set of fields for each record and is stored in a portion/partition of the tenant level objects 104B of the multi-tenant server 104 associated with the corresponding tenant system 102 such that the physical object is only accessible to the tenant system 102 (e.g., the tenant systems $102_2$ and $102_3$ are not permitted to read or write to the physical object of the tenant system $102_1$). The request may cause the addition of a record in a shadow object in the portion/partition of the tenant level objects 104B associated with the tenant system 102. The shadow object represents uncommitted data to the physical object (i.e., data for which a consensus amongst the peers in the peer-to-peer blockchain network 108 has not yet been achieved). The shadow object may be used by the transaction queue 104A for generating a transaction object, which will be distributed/made available to the other tenant systems 102 for receiving consensus for the proposed addition/modification to the physical object of the tenant system 102.

In one implementation, the set of fields of the transaction object is a subset of the fields of physical objects and the set of fields of the transaction object are defined by an exchange object, which is included in the network level objects 104C. In this implementation, the exchange object may include a set of exchange fields, which will be included in the transaction object, and each exchange field of the exchange object is mapped to a field in the physical objects of the tenant systems 102. For example, a physical object of the tenant system $102_1$ may include fields A-D, a physical object of the tenant system $102_2$ may include fields E-H, and a physical object of the tenant system $102_3$ may include fields I-K. In this example, a first exchange field of the exchange object of the peer-to-peer blockchain network 108 may be mapped to the field B of the tenant system $102_1$, the field F of the tenant system $102_2$, and the field I of the tenant system $102_3$. Similarly, a second exchange field of the exchange object of the peer-to-peer blockchain network 108 may be mapped to the field C of the tenant system $102_1$, the field E of the tenant system $102_2$, and the field J of the tenant system $102_3$. Accordingly, when a proposal for adding/modifying a record for the physical object of the tenant system $102_1$ is received, the corresponding transaction object includes the first exchange field with a value from field B of the proposed record in the physical/shadow object and the second exchange field with a value from field C of the proposed record in the physical/shadow object. The exchange object provides a uniform transaction object for verification/validation purposes in the peer-to-peer blockchain network 108 while allowing the tenant system $102_1$ to only reveal particular portions of information to other tenants/peers in the peer-to-peer blockchain network 108 (e.g., sensitive information/fields in physical objects may not be included in transaction objects which are distributed amongst tenant systems $102_1$-$102_3$ in the peer-to-peer blockchain network 108 and later included in distributed ledgers).

As described herein, the multi-tenant server 104 may perform many of the functions of the peer-to-peer blockchain network 108 on behalf of the tenant systems 102. In particular, the multi-tenant server 104 may include a virtual space/organization for each of the tenant systems 102. Each virtual space/organization may include data and applications/services for corresponding tenant systems 102 and is logically separate from all other virtual spaces/organizations of other tenant systems 102. For example, each virtual space/organization may include tenant level objects 104B corresponding to respective tenants/tenant systems 102 and separate instantiations of or access to blockchain services 104D. In this configuration/architecture, the virtual space/organization for each tenant system 102 may perform one or more blockchain functions/operations on behalf of the corresponding tenant system 102. For example, in response to receipt of a request from the tenant system $102_1$ to add a new record to or modify an existing record of a physical object of the tenant system $102_1$, the multi-tenant server 104 may generate a shadow object record in the virtual space/organization of the tenant system $102_1$ within the multi-tenant server 104. In response, the transaction queue 104A may generate a transaction object corresponding to the record in the shadow object using the exchange object of the peer-to-peer blockchain network 108 and a set of cryptographic keys of the tenant system $102_1$ such that the transaction object may be distributed or otherwise be made available to virtual spaces/organizations of the other tenant systems $102_2$ and $102_3$. The virtual spaces/organizations of the other tenant systems $102_2$ and $102_3$ may thereafter analyze the transaction object to determine whether validation/verification is appropriate.

The transaction queue 104A may wait for validation/verification from the virtual spaces/organizations of the tenant systems $102_2$ and $102_3$ such that consensus for the proposed alteration to the physical object of the tenant system $102_1$ is achieved. In response to this consensus, a virtual space/organization of a leader tenant system 102 may (1) add a record or modify a record (as appropriate) in a corresponding physical object of this leader tenant system 102 and (2) add a corresponding entry/block to a distributed ledger of this leader tenant system 102. Thereafter, the virtual space/organization of a leader tenant system 102 may transmit a request to the virtual spaces/organizations of the other/remaining tenant systems 102 to commit the change to their physical objects (based on a mapping defined in the exchange object) and/or add a corresponding entry/block to a ledger of these other/remaining tenant systems 102.

As illustrated above and as will be described in greater detail below, the cloud environment/system provided by the multi-tenant server 104 (e.g., the virtual spaces/organizations provided by the multi-tenant server 104) may be used for managing blockchain transactions between the tenant systems $102_1$-$102_3$. Accordingly, the cloud environment/system implemented by the multi-tenant server 104 provides the same level of security, trust, and immutability of information as a blockchain network during inter-tenant communications while centralizing functionality/operations of the peer-to-peer blockchain network 108. Further, the computing environment 100, including the multi-tenant server 104, implements the peer-to-peer blockchain network 108 to allow use of smart contract as described herein.

As will be described in greater detail below, the multi-tenant server 104 may include blockchain interfaces 104E that may be used by an administrator for configuring the peer-to-peer blockchain network 108. As used herein, an interface defines a set of functions and/or variables that must be included in any class or object that implements this interface. Although the inclusion of these functions and variables are dictated by the interface, the implementation/use is not controlled by the interface. For example, an interface in the blockchain interfaces 104E may include a transaction message interface for facilitating a transaction message in a blockchain network. The transaction message interface may include (1) an initiating address function for setting an initiating address of a transaction message; (2) a target address function for setting a target address of the transaction message; and (3) an object selection function for selecting an object for use by the transaction message. Accordingly, the example transaction message interface indicates three functions that are required to be present in an implementing class or object, including names, types, and inputs to these three functions, but leaves the implementations open to the administrator of the blockchain network.

Each element of the computing environment 100 of FIG. 1 will now be described in greater detail below by way of example. In some implementations, the computing environment 100 may include more elements than those shown in FIG. 1. Accordingly, the computing environment 100 of FIG. 1 is purely for illustrative purposes.

As shown in FIG. 1 and described above, the tenant systems $102_1$-$102_3$ and the multi-tenant server 104 may be connected through a set of one or more communication networks 106. The set of one or more communication networks 106 may be, for example, a local area network (LAN), a wide area network (WAN), a global area network (GAN), such as the Internet, or a combination of such networks. In another implementation, the tenant systems $102_1$-$102_3$ and the multi-tenant server 104 may maintain a direct connection to each other via a wired or wireless medium.

Each of the tenant systems $102_1$-$102_3$ may be a computing system that may be operated by one or more users. For example, each of the tenant systems $102_1$-$102_3$ may be a personal computer (PC), a workstation, a laptop computer, a tablet computer, a mobile phone, a smartphone, a personal digital assistant (PDA), or the like. As will be described in greater detail below, the tenant systems $102_1$-$102_3$ may communicate with the multi-tenant server 104 to modify/add/store and retrieve data.

The tenant systems $102_1$-$102_3$ (sometimes referred to as client, peer, or user systems) may each include a screen/display (e.g., a liquid crystal (LCD) display) for presenting an interface (e.g., a graphical user interface (GUI)) to a user, including an interface presented in a web page. As will be described in greater detail below, each of the tenant systems $102_1$-$102_3$ may include a corresponding transaction generator 110 for receiving input from a user (e.g., via a user interface) to alter a physical object (e.g., addition of a new record in the physical object or modification of an existing record in the physical object) or adding/updating a smart contract in the peer-to-peer blockchain network.

The tenant systems $102_1$-$102_3$ may each be associated with one or more organizations/tenants that are managed by the multi-tenant server 104. For example, users of the tenant system $102_1$ may be customers of a first organization/tenant and a user of the tenant system $102_2$ may be a customer of a second organization/tenant. Organizations/tenants may be any firm, corporation, institution, association, or society that has contracted with an administrator of the multi-tenant server 104 to provide users access to data stored therein via the tenant systems $102_1$-$102_3$.

In one implementation, the multi-tenant server 104 may be any computing device that provides users access to resources via the tenant systems 102 and the communication network(s) 106. For example, the multi-tenant server 104 may provide users of the tenant systems $102_1$-$102_3$ access to data in one or more physical objects and/or one or more corresponding distributed peer ledgers that describe changes to the physical objects. For instance, a physical object of the tenant system $102_1$ may correspond to a medical lab report. In this example implementation, the records in the physical object may include a lab report identifier field, a patient name field, a lab network identifier field, a lab test identifier field, a patient identifier field, a social security number field, and a distribution field, which indicates when a patient has authorized the sharing/distribution of medical records of the patient in the peer-to-peer blockchain network 108. When an alteration/change is desired to a physical object of a system 102 (e.g., addition of a new record to a physical object or modification of an existing record in a physical object), the multi-tenant server 104 uses the transaction queue 104A, the tenant level objects 104B, the network level objects 104C, and the blockchain services 104D to attempt to make these alterations in the peer-to-peer blockchain network 108 (e.g., alterations reflected in physical objects and distributed ledgers associated with the tenant systems 102).

The multi-tenant server 104 may include various elements of hardware and software of a multi-tenant system. As used herein, the term "multi-tenant system" refers to those systems in which various elements of hardware and software may be shared by one or more tenants. For example, the multi-tenant server 104 may simultaneously process requests for a great number of tenants, and a given database table may store records for a potentially much greater number of tenants. The multi-tenant server 104 may include an application platform including a framework (e.g., services and metadata) that allows applications to execute, such as the hardware or software infrastructure of the system. In one implementation, the multi-tenant server 104 includes separate virtual spaces/organizations (sometimes referred to as portions or partitions) for data/objects as well as services of each tenant systems $102_1$-$102_3$. For example, each tenant system $102_1$-$102_3$ may be assigned a separate virtual space/organization. Each virtual space/organization is a logical partition within the multi-tenant server 104 and includes separate tenant level objects 104B that are only accessible to that tenant system 102 and are inaccessible to other tenant systems 102 (e.g., tenant systems 102 cannot read and/or write tenant level objects 104B of another tenant system 102) in addition to services used by the multi-tenant server 104 on behalf of the corresponding tenant system 102 (e.g., blockchain services 104D).

As noted above, the blockchain interfaces 104E are a set of interfaces (i.e., a set of definitions/templates) for implementation by objects in a blockchain network 108. The blockchain interfaces 104E (1) allow for the use of various types of data and transactions in the peer-to-peer blockchain network 108 and/or (2) facilitate the use of the multi-tenant server 104 for management of the peer-to-peer blockchain network 108. Accordingly, an administrator of the peer-to-peer blockchain network 108 may utilize the blockchain interfaces 104E to configure the peer-to-peer blockchain network 108 for a variety of different data and transaction types that are facilitated by the multi-tenant server 104.

FIG. 2 shows an object mapping interface 200, according to one example implementation. As shown in FIG. 2, the object mapping interface 200 (i.e., interface ObjectMapping) includes a setObject function, which takes an object value as an input parameter. In some implementations, the setObject function may set/designate an object associated with a tenant/tenant system 102 (e.g., a physical object associated with a tenant/tenant system 102) for use in the peer-to-peer blockchain network 108. The object mapping interface 200 may also include a complementary getObject function which returns the object originally set by the setObject function.

Figure 3:
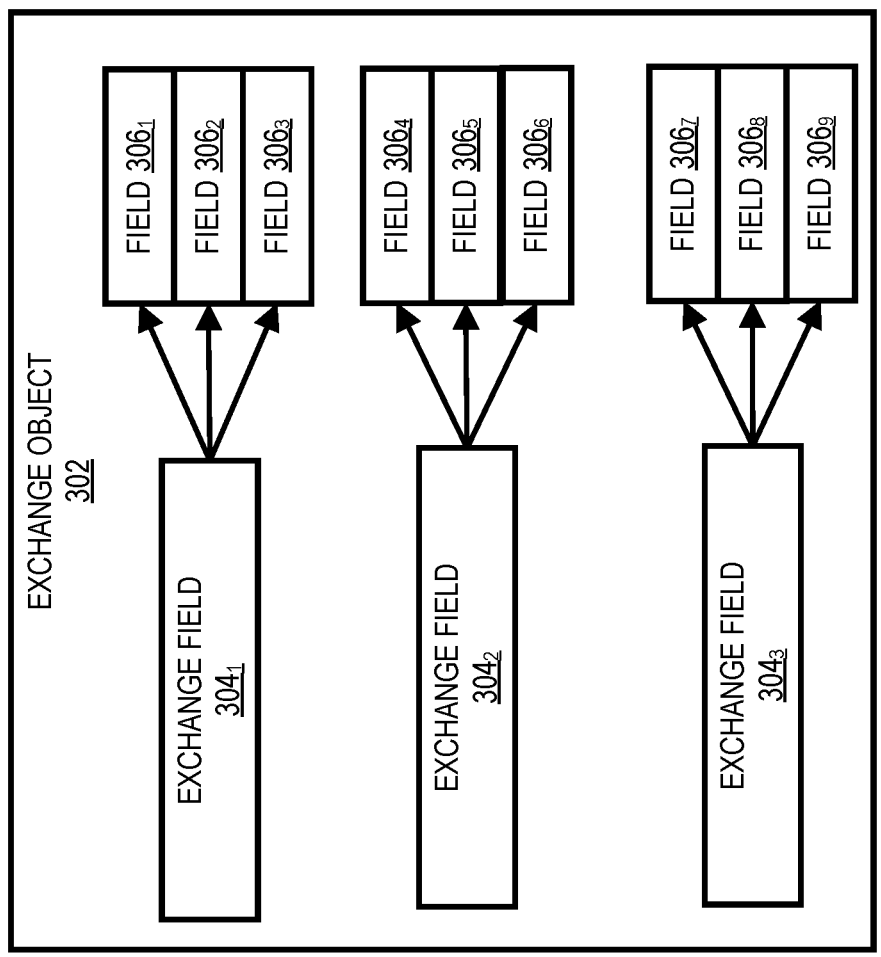
FIG. 3 shows an exchange object, according to one example implementation.

As also shown in FIG. 2, the object mapping interface 200 may include a setFieldMapping function, which takes an identifier (ID) value of a tenant/tenant system 102 (i.e., Id tenant) and a set of fields for a field mapping (i.e., Map<String, String> fieldMapping) as a set of input parameters. In particular, one of the fields in the set of fields corresponds to a field of a physical object of a tenant/tenant system 102 and a second field in the set of fields corresponds to an exchange field of an exchange object of the peer-to-peer blockchain network 108. Accordingly, the setFieldMapping function may be used for indicating mappings between fields of a tenant/tenant system 102 physical object, which was set/designated by the setObject, and exchange fields of an exchange object associated with the peer-to-peer blockchain network 108. For example, FIG. 3 shows an exchange object 302 and corresponding mappings between fields $306_1$-$306_9$ of physical objects of tenants/tenant systems 102 and exchange fields $304_1$-$304_3$ that may be established using the setFieldMapping function. In this representation, each exchange field 304 is mapped to a single field 306 of a tenant/tenant system 102. Accordingly, each of the fields $306_1$-$306_3$ correspond to separate physical objects and tenants/tenant systems 102, each of the fields $306_4$-$306_6$ correspond to separate physical objects and tenants/tenant systems 102, and each of the fields $306_7$-$306_9$ correspond to separate physical objects and tenants/tenant systems 102. The object mapping interface 200 may include a complementary getFieldMapping function that takes in an identifier value of a tenant/tenant system 102 as an input parameter (i.e., Id tenant) and returns fields mappings set/designated by the setFieldMapping function (i.e., Map<String, String>).

In some implementations, the object mapping interface 200 may correspond to an owner. For example, the setOwner function may take in an owner identifier (i.e., Id owner) as a parameter that indicates a system or party in the computing environment 100 that owns the field mapping set by the setFieldMapping function. For example, the field mapping may be owned by a tenant system 102 or a network organization that is separate from the tenant systems 102 and is tasked with configuring the peer-to-peer blockchain network 108. The object mapping interface 200 may include a complementary getOwner function that returns the identifier of the owner set by the setOwner function.

The blockchain interfaces 104E may additionally include a transaction message interface for facilitating a transaction in the peer-to-peer blockchain network 108. For example, FIG. 4 shows a transaction message interface 400 (i.e., interface TransactionMessage), according to one example implementation. As shown in FIG. 4, the transaction message interface 400 may include a setId function that takes in string value as an input parameter (i.e., String name), which indicates an identifier for a corresponding transaction message. The transaction message interface 400 may include a complementary getId function for returning a string value of a corresponding identifier of a transaction message, which was originally set by the setId function.

As shown in FIG. 4, the transaction message interface 400 may also include a setFromAddress function and a setToAddress function, which each take a DigitalAddress value as an input parameter. For example, the setFromAddress function takes DigitalAddress fromAddress as an input parameter, which indicates an address of a recipient/target party, and the setToAddress function takes DigitalAddress toAddress as an input parameter, which indicates an address of an originating party. The transaction message interface 400 may also include complementary getFromAddress and getToAddress functions, which return DigitalAddress values of a recipient/target party and an originating party, respectively.

In some implementations, a digital address of a target or originator of a transaction may not be known (e.g., a DigitalAddress of a target or originator). Instead, another identifier of the target or originator may be known. In these implementations, the transaction message interface 400 may include setFromId and setToId functions that each take in an identifier (ID) value as an input parameter (i.e., Id id). When implemented, the setFromId and setToId functions may determine a digital address of a target or originator, respectively, of a transaction (e.g., a DigitalAddress of a target or originator) and set the digital address accordingly.

Figure 5:
FIG. 5 shows an enumerated identifier level, according to one example implementation.

In some implementations, transactions may involve various parties in the multi-tenant system/environment implemented by the multi-tenant server 104. For example, the parties may include one or more of tenants, tenant systems, users, accounts, networks, and contacts. In these implementations, the setFromId and setToId functions may include a identifier level (IdLevel) value as an additional input parameter (i.e., IdLevel idLevel). The IdLevel may be an enumerated value for parties in the multi-tenant system/environment implemented by the multi-tenant server 104. FIG. 5 shows an enumerated IdLevel 500, according to one example implementation. As shown, the IdLevel 500 includes the enumerated values of NETWORK, TENANT, USER, ACCOUNT, and CONTACT, which correspond to various parties in the multi-tenant system/environment implemented by the multi-tenant server 104. Accordingly, IdLevel values may be used by the setFromId and setToId functions to indicate a type of identifier value (i.e., Id id) such that an appropriate digital address may be determined.

As shown in FIG. 4, the transaction message interface 400 may also include a setObjectMapping function, which takes an ObjectMapping value as an input parameter, which indicates an ObjectMapping that is used for the transaction. For example, the ObjectMapping value may correspond to an object/class implemented using the object mapping interface 200. The transaction message interface 400 may also include complementary getObjectMapping, which returns an ObjectMapping value for the corresponding transaction.

The blockchain interfaces 104E may additionally include a transaction interface for further facilitating a transaction in the peer-to-peer blockchain network 108. For example, FIG.

6 shows a transaction interface 600 (i.e., interface Transaction), according to one example implementation. As shown in FIG. 6, the transaction interface 600 may include a setId function that takes in a string value as an input parameter (e.g., String name), which indicates an identifier for a corresponding transaction. The transaction interface 600 may include a complementary getId function for returning a string identifier of a corresponding transaction, which was originally set by the setId function.

As shown in FIG. 6, the transaction interface 600 may include a setTransactionMessage function that takes a transaction message 400 as an input parameter (i.e., TransactionMessage transactionMessage). When implemented, the setTransactionMessage function sets the transaction message 400 used by the corresponding transaction to the transaction message input parameter. The transaction interface 600 may include a complementary getTransactionMessage function that returns a transaction message 400 (i.e., TransactionMessage) for the corresponding transaction.

As also shown in FIG. 6, the transaction interface 600 may include a setTransactionType function that takes a transaction type as an input parameter (e.g., TransactionType transactionType). When implemented, the setTransactionType function sets the type of the transaction message 400 used by the corresponding transaction to the transaction type input parameter. For example, FIG. 7 shows an enumerated transaction type object 700 (i.e., TransactionType), according to one example implementation. As shown, the enumerated values for the enumerated transaction type object 700 may have the values TRANSFER, APPROVE, CONSENT, SHARE_OWNERSHIP, QUERY, BALANCE_OF, and ALLOWANCE, which corresponds to the various types of transactions that may be made/used in the peer-to-peer blockchain network 108. The transaction interface 600 may include a complementary getTransactionType function that returns a transaction type object 700 (e.g., TransactionType) for the corresponding transaction.

The blockchain interfaces 104E may additionally include a contract interface for facilitating contracts (sometimes referred to as "smart contracts") in the peer-to-peer blockchain network 108. For example, FIG. 8 shows a contract interface 800 (i.e., interface Contract), according to one example implementation. As shown in FIG. 8, the contract interface 800 may include an action function that takes in a Transaction 600 as an input parameter (e.g., Transaction transaction) and returns a Boolean value. In one implementation, the action function indicates whether a set of conditions have been met based on the Transaction 600 input parameter. The contract interface 800 may also include a runRules function that takes a set of rules (e.g., Set<rules>) as an input parameter. The set of rules may be performed/run in response to the action function indicating that a corresponding set of conditions have be met in relation to a Transaction 600.

Figure 9:
FIG. 9 shows a token interface, according to one example implementation.

The above described interfaces allow use of various types of data and corresponding transactions in a peer-to-peer blockchain network 108. In particular, the object mapping interface 200 allows the selection/setting and use of any type of object. However, interfaces may be provided in the blockchain interfaces 104E for specific types of data and corresponding transactions. For example, FIG. 9 shows a token interface 900, according to one example implementation. Similar to the object mapping interface 200, the token interface 900 includes a set of functions for implementation. As shown in FIG. 9, the token interface 900 includes a setName function that takes in a string variable (i.e., String name) as an input parameter. The setName function may be used for setting the name of a token currency that will be used by the peer-to-peer blockchain network 108. The token interface 900 make include a complementary getName function for returning a string value of the name set by the setName function.

As also shown in FIG. 9, the token interface 900 may include a setDecimalLimit function that takes an integer value as an input parameter (e.g., int numberOfDecimals). The integer value indicates the number of places to the right of the decimal place that are tracked for a designated token/currency. For example, a token object implementing the token interface 900 may track two places to the right of the decimal point as set by the setDecimalLimit function. The token interface 900 may include a complementary getDecimalLimit function for returning an integer value of the number of decimal places set by the setDecimalLimit function.

As additionally shown in FIG. 9, the token interface 900 may include a setExchangeRate function that takes a currency value as an input parameter (i.e., Currency rate). The currency value indicates the exchange rate between the token object implementing the token interface 900 and another token/currency. For example, the setExchangeRate function may indicate that a single token is equivalent to two U.S. Dollars. The token interface 900 may include a complementary getExchangeRate function for returning a currency value set by the setExchangeRate function.

As finally shown in FIG. 9, the token interface 900 may include a setFounder function that takes in an identifier (Id) value as an input parameter (e.g., Id id). The identifier value indicates the owner or administrator of the token object that implements the token interface 900. For example, a tenant or tenant system 102 may be set by the setFounder setExchangeRate as the owner/founder of the token object that implements the token interface 900. The token interface 900 make include a complementary getFounder function for returning an identifier of the owner/founder of the token object that implements the token interface 900.

Based on the use of the token interface 900, other interfaces may be provided in the blockchain interfaces 900 to accommodate token transactions. For example, FIG. 10 shows a token transaction message interface 1000 (e.g., interface TokenTransactionMessage) that extends the transaction message interface 400 of FIG. 4. As shown, the token transaction message interface 1000 includes a setTokens function that takes a double value as an input parameter (e.g., Double tokens). The setTokens function sets the number of tokens that are distributable in the peer-to-peer blockchain network 108. The token transaction message interface 1000 may also include a complementary getTokens function, which returns a double value corresponding to the number of tokens that are distributable in the peer-to-peer blockchain network 108.

As also shown in FIG. 10, the token transaction message interface 1000 may include a setTokenPercent function that takes a double value as an input parameter (e.g., Double percent). The token transaction message interface 1000 may additionally include a complementary getTokenPercent function, which returns a double value of the percent.

Similar to the extension of the transaction message interface 400 for use with tokens, the contract interface 800 may be extended for purposes of token-based contracts. For instance, FIG. 11 shows a token contract interface 1100 (e.g., interface TokenContract) that extends the contract interface 800, according to one example implementation. Since the token contract interface 1100 is used with token transactions, the token contract interface 1100 may include an action function which takes a TokenTransactionMessage object as an input parameter and returns a Boolean value. Similar to the action function of the contract interface 800, the action function of the token contract interface 1100 indicates whether a set of conditions have been met based on the TokenTransactionMessage object input parameter.

On the basis of the token contract interface 1100, a token contract may be implemented. For instance, FIG. 12 shows a token contract 1200 for company A (i.e., class CompanyATokenContract) that is implemented based on the token contract interface 1100, according to one example implementation. In the token contract 1200 of FIG. 12, the action function and the runRules function are implemented by an administrator of the peer-to-peer blockchain network 108 or a representative of Company A.

In some implementations, the blockchain interfaces 104E may include a membership interface to create and manager consortiums. For instance, FIG. 13 shows a network service interface 1300, according to one example implementation. As shown in FIG. 13, the network service interface 1300 may include functions for initializing a consortium. For example, the network service interface 1300 may include an initialize function that takes a set of addresses corresponding to initial members of the consortium (e.g., Boolean initializeConsortium(List<DigitalAddress> memberAddresses)) and an initialize function that takes an organization identifier corresponding to initial members of the consortium (e.g., Boolean initializeConsortium(List<Id> orgIds)). As shown in FIG. 13, the network service interface 1300 may also include functions for adding members to an initialized consortium. For example, the network service interface 1300 may include an add member function that takes a set of addresses corresponding to new members of the consortium (e.g., Boolean addMemberToConsortium(DigitalAddress memberAddress)) and an add member that takes an organization identifier corresponding to new members of the consortium (e.g., Boolean addMemberToConsortium(Id orgId)). As shown in FIG. 13, the network service interface 1300 may also include functions for getting/indicating/listing members of a consortium. For example, the network service interface 1300 may include a get consortium members function that outputs addresses of members in the consortium (e.g., List<DigitalAddress> getConsortiumMembersByAddress( )) and a get consortium members function that outputs organization identifiers of members in the consortium (e.g., List<ID> getConsortiumMembersByOrgId( )).

Based on the interfaces described above, which may be included in the blockchain interfaces 104E, the peer-to-peer blockchain network 108 may be configured for various different data types and corresponding transactions. In particular, the blockchain interfaces 104E (1) allow for the use of various types of data and transactions in the peer-to-peer blockchain network 108 and/or (2) facilitate the use of the multi-tenant server 104 for management of the peer-to-peer blockchain network 108. Accordingly, an administrator of the peer-to-peer blockchain network 108 may utilize the blockchain interfaces 104E to configure the peer-to-peer blockchain network 108 for a variety of different data and transaction types that are facilitated by the multi-tenant server 104.

Figure 14:
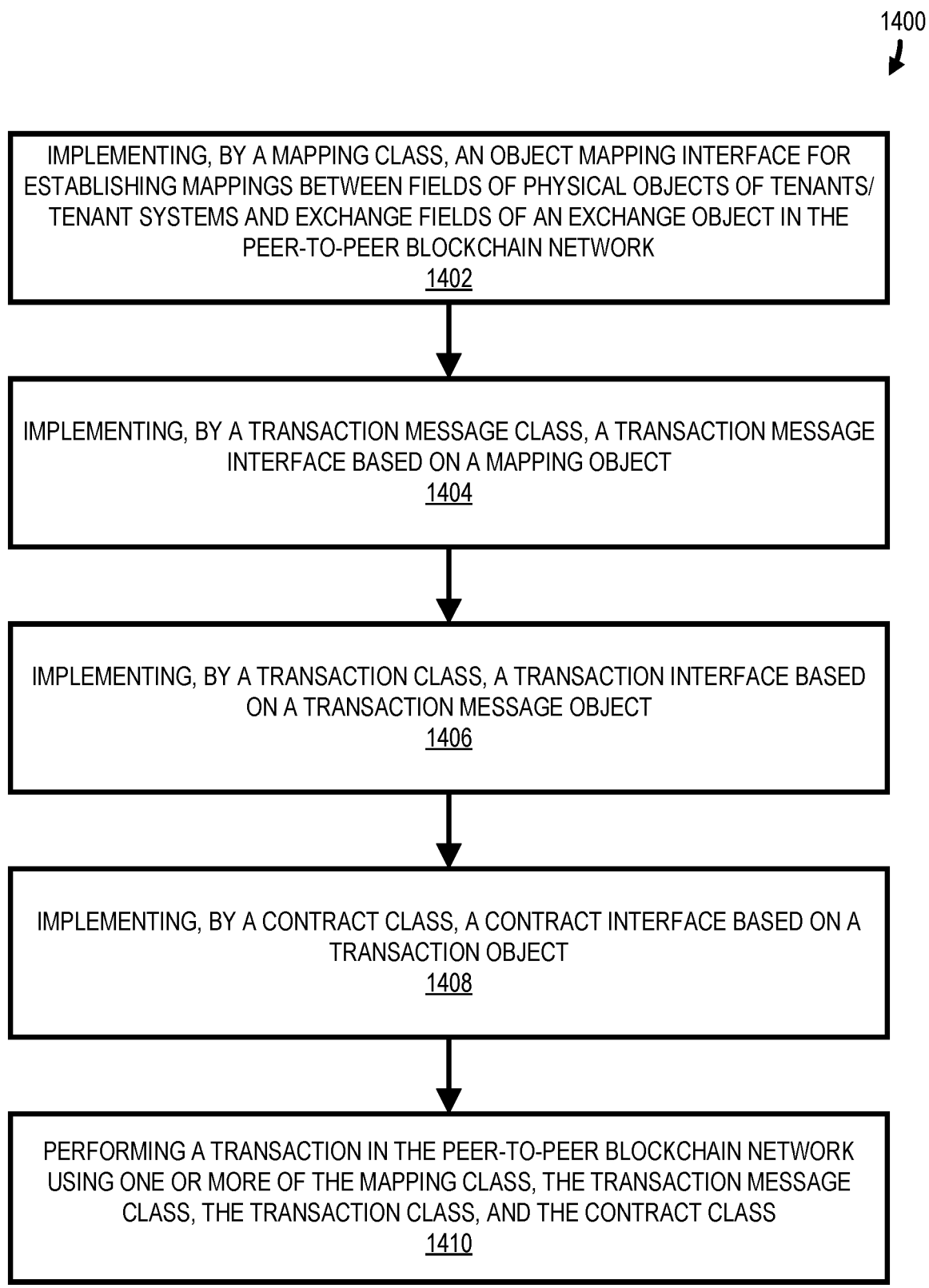
FIG. 14 shows a method for managing data in a peer-to-peer blockchain network using the blockchain interfaces, according to one example implementation.

Turning now to FIG. 14, a method 1400 according to some implementations will be described for the multi-tenant server 104 to manage data in the peer-to-peer blockchain network 108. In particular, the blockchain interfaces 104E may be used for configuring and performing transactions in the peer-to-peer blockchain network 108.

The operations of the method 1400 may be performed by one or more components of the example computing environment 100 shown in FIG. 1. However, in other implementations, the method 1400 may operate in other environments, including different implementations of the multi-tenant server 104.

As noted above, the operations in the flow diagram of FIG. 14 will be described with reference to the exemplary implementations of the other figures. However, it should be understood that the operations of the flow diagram can be performed by implementations other than those discussed with reference to the other figures, and the implementations discussed with reference to these other figures can perform operations different than those discussed with reference to the flow diagrams.

Although described and shown in FIG. 14 in a particular order, the operations of the method 1400 are not restricted to this order. For example, one or more of the operations of the method 1400 may be performed in a different order or in partially or fully overlapping time periods. Accordingly, the description and depiction of the method 1400 is for illustrative purposes and is not intended to restrict to a particular implementation.

As shown in FIG. 14, the method 1400 may commence at operation 1402 with the multi-tenant server 104 implementing the object mapping interface 200 for establishing mappings between fields of physical objects of tenants/tenant systems 102 and exchange fields of an exchange object in the peer-to-peer blockchain network 108. For example, a mapping class may implement the object mapping interface 200, including one or more of the set object function (e.g., setObject(Object object)), the get object function (e.g., getObject( )), set field mapping function (e.g., setFieldMapping(Id tenant, Map<String, String> fieldMapping)), the get field mapping function (e.g., getFieldMapping(Id tenant)), set owner function (e.g., setOwner(Id owner)), and get owner function (e.g., getOwner( )). For instance, implementing the object mapping interface 200 may include implementing (1) the set object function such that the set object function designates an object of a tenant/tenant system 102 (e.g., a physical object of a tenant/tenant system 102)) for use in the peer-to-peer blockchain network 108, (2) the set field mapping function to map fields in the set/designated tenant object and fields of an exchange object 302 used by the peer-to-peer blockchain network 108, and (3) a set owner function to set a tenant/tenant system 102 as an owner of the mappings. Implementing, as used herein, includes generating and providing logic defined by code (e.g., C/C++, Java, Apex, etc.) to perform operations of an associated function, object, and/or class.

At operation 1404, the multi-tenant server 104 implements the transaction message interface 400 based on a mapping object. For example, a transaction message class may implement the transaction message interface 400, including one or more of the set identifier function (e.g., setId(String name)), the get identifier function (e.g., getId( )), the set from address function (e.g., setFromAddress(DigitalAddress fromAddress)), the get from address function (e.g., getFromAddress( )), the set to address function (e.g., setToAddress(DigitalAddress toAddress)), the get to address function (e.g., getToAddress( )), the set from identifier function (e.g., setFromId(Id id, IMDLIdLevel idLevel)), the get from identifier function (e.g., getFromId( )), the set to identifier (e.g., setToId(Id id, IMDLIdLevel idLevel)), the get to identifier function (e.g., getToId( )), the set object mapping function (e.g., setObjectMapping ObjectMapping objectMapping)), and the get object mapping function (e.g., ObjectMapping getObjectMapping( )). For instance, implementing the transaction message interface 400 may include implementing (1) an initiating address function (e.g., the set from address function or the set from identifier function) to set an initiating address of a transaction/transaction message object, (2) a target address function (e.g., the set to address function or the set to identifier function) to set a target address of the transaction/transaction message object, and (3) a set object mapping function to select an object mapping object for use in the transaction/transaction message object.

At operation 1406, the multi-tenant server 104 implements the transaction interface 600 based on a transaction message object. For example, a transaction class may implement the transaction interface 600, including one or more of the set identifier function (e.g., setId(String name)), the get identifier function (e.g., getId( )), the set transaction message function (e.g., getTransactionMessage(TransactionMessage transactionMessage)), the get transaction message function (e.g., getTransactionMessage( )), the set transaction type function (e.g., setTransactionType(TransactionType TransactionType)), and the get transaction type function (e.g., TransactionType getTransactionType( )). For instance, implementing the transaction interface 600 may include implementing (1) the set transaction message function to set a transaction message object for use in the transaction and (2) the set transaction type function to set a type of the transaction from a set of transaction types (e.g., a transfer of a record, approval of a change to an object, sharing ownership of a record, and a query).

At operation 1408, the multi-tenant server 104 implements the contract interface 800 based on a transaction object. For example, a contract class may implement the contract interface 800, including one or more of an action function (e.g., action(Transaction transaction)) to indicate a set of actions to be performed based on the transaction object in response to performance of the contract object and a rules function (e.g., runRules(Set<rules>)) to indicate a set of rules, wherein the set of actions are performed in response to the set of rules being met based on the transaction object.

At operation 1410, the multi-tenant server 104 may perform a transaction on behalf of a party in the peer-to-peer blockchain network 108 (e.g., a tenant system 102) using the implemented object mapping interface 200, transaction message interface 400, transaction interface 600, and/or contract interface 800 (e.g., using the mapping class, transaction message class, transaction class, and/or contract class). For example, the multi-tenant server 104 may use functions of an object/class implementing the object mapping interface 200 to (1) set/select objects of parties in the peer-to-peer blockchain network 108, (2) set mappings between fields of the objects and an exchange object, and/or (3) set an owner of the mapping. The multi-tenant server 104 may thereafter use functions of an object/class implementing the transaction message interface 400 to (1) set an address of a target/destination party for the transaction, (2) set an address of an originating party for the transaction, and (3) set/select an object defining mappings used by the transaction (e.g., a mapping object implementing the object mapping interface 200). The multi-tenant server 104 may thereafter use functions of an object/class implementing the transaction interface 600 to (1) set/select a transaction object (e.g., a transaction object implementing the transaction message interface 400) and/or (2) set/select a transaction type for the transaction. Optionally, the multi-tenant server 104 may thereafter use functions of an object/class implementing the contract interface 800 to establish a smart contract.

As used above, the term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or a tenant system) to communicate with the service. The server and client electronic devices may be operated by users respectively in the roles of administrator (also known as an administrative user) and end user.

Figure 15A:
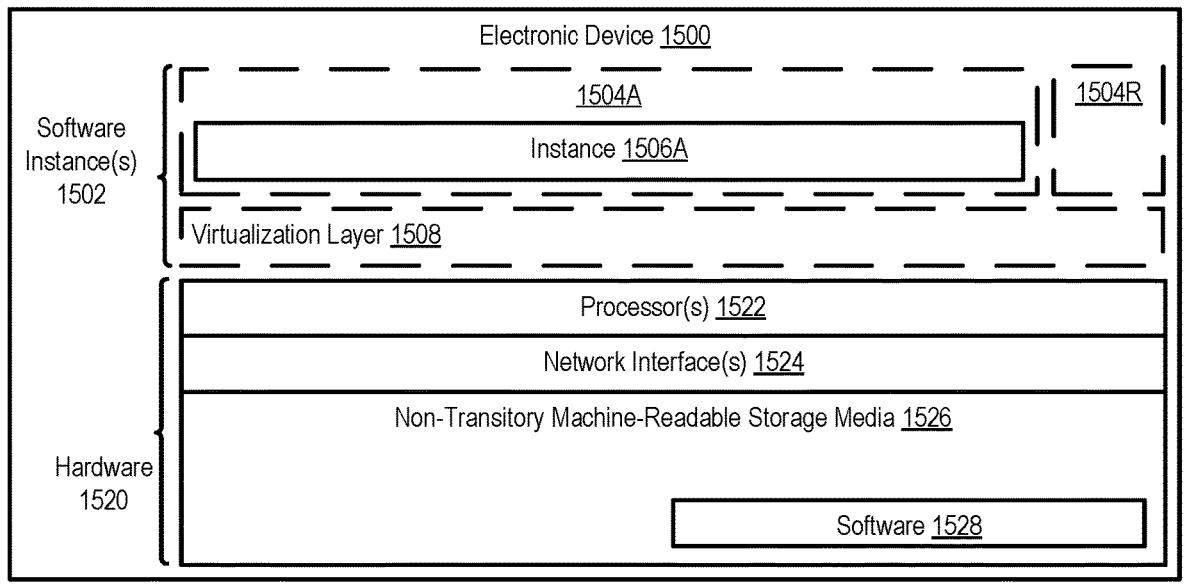
FIG. 15A shows an electronic device according to one example implementation.

FIG. 15A is a block diagram illustrating an electronic device 1500 according to some example implementations. FIG. 15A includes hardware 1520 comprising a set of one or more processor(s) 1522, a set of one or more network interfaces 1524 (wireless and/or wired), and non-transitory machine-readable storage media 1526 having stored therein software 1528 (which includes instructions executable by the set of one or more processor(s) 1522). Each of the previously described tenant systems 102 and the transaction queue 104A, the tenant level objects 104B, the network level objects 104C, and the blockchain services 104D may be implemented in one or more electronic devices 1500. In one implementation: 1) each of the tenant systems 102 is implemented in a separate one of the electronic devices 1500 (e.g., in user electronic devices operated by users where the software 1528 represents the software to implement tenant systems 102 to interface with the transaction queue 104A, the tenant level objects 104B, the network level objects 104C, the blockchain services 104D, and the blockchain interfaces 104E (e.g., a web browser, a native client, a portal, a command-line interface, and/or an application program interface (API) based upon protocols such as Simple Object Access Protocol (SOAP), Representational State Transfer (REST), etc.)); 2) the transaction queue 104A, the tenant level objects 104B, the network level objects 104C, the blockchain services 104D, and the blockchain interfaces 104E are implemented in a separate set of one or more of the electronic devices 1500 (e.g., a set of one or more server electronic devices where the software 1528 represents the software to implement the transaction queue 104A, the tenant level objects 104B, the network level objects 104C, the blockchain services 104D, and the blockchain interfaces 104E); and 3) in operation, the electronic devices implementing the tenant systems 102 and the transaction queue 104A, the tenant level objects 104B, the network level objects 104C, the blockchain services 104D, and the blockchain interfaces 104E would be communicatively coupled (e.g., by a network) and would establish between them (or through one or more other layers) connections for submitting a proposed new record or a proposed modification to an existing record in a physical object to the multi-tenant server 104. Other configurations of electronic devices may be used in other implementations (e.g., an implementation in which the tenant systems 102 and the multi-tenant server 104 are implemented on a single electronic device 1500).

In electronic devices that use compute virtualization, the set of one or more processor(s) 1522 typically execute software to instantiate a virtualization layer 1508 and software container(s) 1504A-R (e.g., with operating system-level virtualization, the virtualization layer 1508 represents the kernel of an operating system (or a shim executing on a base operating system) that allows for the creation of multiple software containers 1504A-R (representing separate user space instances and also called virtualization engines, virtual private servers, or jails) that may each be used to execute a set of one or more applications; with full virtualization, the virtualization layer 1508 represents a hypervisor (sometimes referred to as a virtual machine monitor (VMM)) or a hypervisor executing on top of a host operating system, and the software containers 1504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1528 (illustrated as instance 1506A) is executed within the software container 1504A on the virtualization layer 1508. In electronic devices where compute virtualization is not used, the instance 1506A on top of a host operating system is executed on the "bare metal" electronic device 1500. The instantiation of the instance 1506A, as well as the virtualization layer 1508 and software containers 1504A-R if implemented, are collectively referred to as software instance(s) 1502.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 15B:
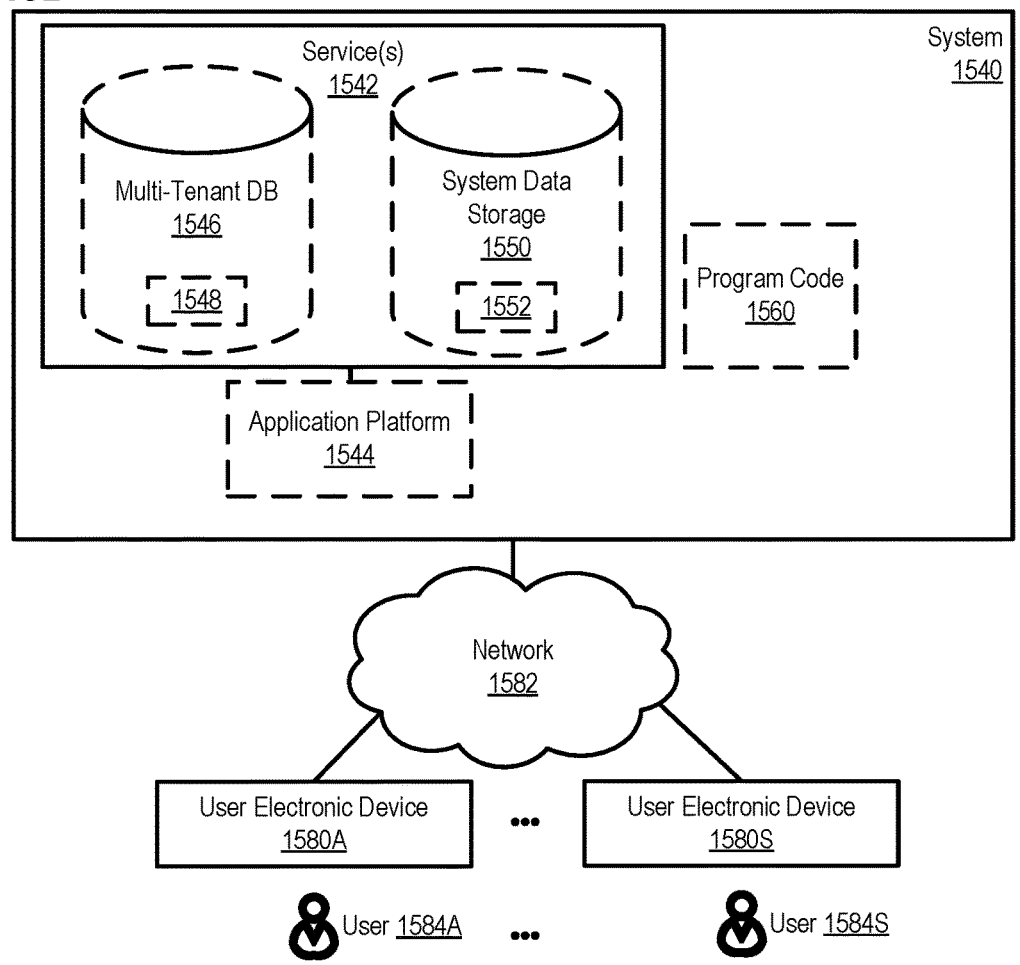
FIG. 15B shows a block diagram of an environment where the computing environment and the server may be implemented according to one example implementation.

FIG. 15B is a block diagram of an environment where the tenant systems $102_1$-$102_3$ and the multi-tenant server 104 may be deployed, according to some implementations. A system 1540 includes hardware (a set of one or more electronic devices) and software to provide service(s) 1542, including the transaction queue 104A, the tenant level objects 104B, the network level objects 104C, the blockchain services 104D, and the blockchain interfaces 104E. The system 1540 is coupled to user electronic devices 1580A-S over a network 1582. The service(s) 1542 may be on-demand services that are made available to one or more of the users 1584A-S working for one or more other organizations (sometimes referred to as outside users) so that those organizations do not need to necessarily be concerned with building and/or maintaining a system, but instead makes use of the service(s) 1542 when needed (e.g., on the demand of the users 1584A-S). The service(s) 1542 may communication with each other and/or with one or more of the user electronic devices 1580A-S via one or more Application Programming Interface(s) (APIs) (e.g., a Representational State Transfer (REST) API). The user electronic devices 1580A-S are operated by users 1584A-S.

In one implementation, the system 1540 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1540 may include an application platform 1544 that enables PAAS for creating, managing, and executing one or more applications developed by the provider of the application platform 1544, users accessing the system 1540 via one or more of user electronic devices 1580A-S, or third-party application developers accessing the system 1540 via one or more of user electronic devices 1580A-S.

In some implementations, one or more of the service(s) 1542 may utilize one or more multi-tenant databases 1546 for tenant data 1548, as well as system data storage 1550 for system data 1552 accessible to system 1540. In certain implementations, the system 1540 includes a set of one or more servers that are running on server electronic devices and that are configured to handle requests for any authorized user associated with any tenant (there is no server affinity for a user and/or tenant to a specific server). The user electronic devices 1580A-S communicate with the server(s) of system 1540 to request and update tenant-level data and system-level data hosted by system 1540, and in response the system 1540 (e.g., one or more servers in system 1540) automatically may generate one or more Structured Query Language (SQL) statements (e.g., one or more SQL queries) that are designed to access the desired information from the one or more multi-tenant database 1546 and/or system data storage 1550.

In some implementations, the service(s) 1542 are implemented using virtual applications dynamically created at run time responsive to queries from the user electronic devices 1580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1544 includes an application setup mechanism that supports application developers' creation and management of applications, which may be saved as metadata by save routines. Invocations to such applications, including the transaction queue 104A, the tenant level objects 104B, the network level objects 104C, the blockchain services 104D, and the blockchain interfaces 104E, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1540 and the user electronic devices 1580A-S.

Each user electronic device 1580A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1540. For example, the user interface device can be used to access data and applications hosted by system 1540, and to perform searches on stored data, and otherwise allow a user 1584 to interact with various GUI pages that may be presented to a user 1584. User electronic devices 1580A-S might communicate with system 1540 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1580A-S might include an HTTP client, commonly referred to as a "browser," for sending and receiving HTTP messages to and from server(s) of system 1540, thus allowing users 1584 of the user electronic device 1580A-S to access, process and view information, pages and applications available to it from system 1540 over network 1582.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for interacting with a blockchain network by a multi-tenant server using a set of blockchain interfaces, the set of blockchain interfaces implementing an object mapping interface, the method comprising:
   designating, by a set object function in the object mapping interface, a tenant object in a multi-tenant system managed by the multi-tenant server for use in the blockchain network, wherein the tenant object is stored by the multi-tenant server and accessible only by a first tenant of the multi-tenant system;
   generating mappings, by a map function in the object mapping interface, for one or more fields of the tenant object to a set of one or more exchange fields of an exchange object stored in the blockchain network, wherein the exchange object further includes mappings for the set of one or more exchange fields to a corresponding one or more fields of one or more other tenant objects that are stored by the multi-tenant server and accessible only by a respective one or more other tenants of the multi-tenant system;
   setting, by a set owner function in the object mapping interface, a tenant of the multi-tenant system as an owner of the mappings, wherein the tenant is tasked as the owner of the mappings to configure the blockchain network using the object mapping interface; and
   generating a transaction object with a set of one or more fields that corresponds to the set of one or more exchange fields of the exchange object, the transaction object to be made available to the tenants of the multi-tenant system to attempt to obtain consensus for a proposed alteration to a tenant object associated with one of the tenants.

2. The method of claim 1, further comprising:
   facilitating, by a transaction message interface in the set of blockchain interfaces, a transaction in the blockchain network.

3. The method of claim 2, wherein the transaction message interface further
   sets, by an initiating address function, an initiating address of the transaction,
   sets, by a target address function, a target address of the transaction, and
   selects, by a set object mapping function, an object mapping object for use in the transaction.

4. The method of claim 3, further comprising:
   setting, by a set transaction message function, a transaction message object for use in the transaction; and
   setting, by a set transaction type function, a type of the transaction from a set of transaction types.

5. The method of claim 4, wherein the set of transaction types includes a transfer of a record, approval of a change to an object, sharing ownership of a record, and a query.

6. The method of claim 5, further comprising:
   identifying, by an action function of a contract object, a set of actions to be performed based on the transaction message object in response to performance of the contract object.

7. The method of claim 6, wherein a contract interface of the set of blockchain interfaces includes a rules function to identify a set of rules, wherein the set of actions are performed in response to the set of rules being met based on the transaction message object.

8. A non-transitory machine-readable storage medium, including instructions that when executed by a processor of a multi-tenant server, cause the processor to perform a set operations of a method for interacting with a blockchain network using a set of blockchain interfaces, the set of blockchain interfaces implementing an object mapping interface, the set of operations comprising:

designating, by a set object function in the object mapping interface, a tenant object in a multi-tenant system managed by the multi-tenant server for use in a blockchain network, wherein the tenant object is stored by the multi-tenant server and accessible only by a first tenant of the multi-tenant system;

generating mappings, by a map function in the object mapping interface, for one or more fields of the tenant object to a set of one or more exchange fields of an exchange object stored in the blockchain network, wherein the exchange object further includes mappings for the set of one or more exchange fields to a corresponding one or more fields of one or more other tenant objects that are stored by the multi-tenant server and accessible only by a respective one or more other tenants of the multi-tenant system;

setting, by a set owner function in the object mapping interface, a tenant of the multi-tenant system as an owner of the mappings, wherein the tenant is tasked as the owner of the mappings to configure the blockchain network using the object mapping interface; and generating a transaction object with a set of one or more fields that corresponds to the set of one or more exchange fields of the exchange object, the transaction object to be made available to the tenants of the multi-tenant system to attempt to obtain consensus for a proposed alteration to a tenant object associated with one of the tenants.

9. The non-transitory machine-readable storage medium of claim 8, wherein the instructions further cause the processor to:

facilitating, by a transaction message interface in the set of blockchain interfaces, a transaction in the blockchain network.

10. The non-transitory machine-readable storage medium of claim 9, wherein the transaction message interface further
sets, by an initiating address function, an initiating address of the transaction,
sets, by a target address function, a target address of the transaction, and
selects, by a set object mapping function, an object mapping object for use in the transaction.

11. The non-transitory machine-readable storage medium of claim 10, wherein the instructions further cause the processor to perform further operations comprising:
setting, by a set transaction message function, a transaction message object for use in the transaction; and
setting, by a set transaction type function, a type of the transaction from a set of transaction types.

12. The non-transitory machine-readable storage medium of claim 11, wherein the instructions further cause the processor to perform a further set of operations comprising:
identifying, by an action function of a contract object, a set of actions to be performed based on the transaction message object in response to performance of the contract object.

13. The non-transitory machine-readable storage medium of claim 12, wherein a contract interface of the set of blockchain interfaces includes a rules function to identify a set of rules, wherein the set of actions are performed in response to the set of rules being met based on the transaction message object.

* * * * *